United States Patent
Günther et al.

(10) Patent No.: US 9,624,901 B2
(45) Date of Patent: Apr. 18, 2017

(54) WORK PLATFORM

(75) Inventors: Sabine Günther, Vejen (DK); Allan Bach, Veflinge (DK); Markus Malaschewski, Schafflund (DE); Mads Bergmann Rasmussen, Esbjerg (DK); Anders Peter Pedersen, Potsdam (DE)

(73) Assignee: LM GLASFIBER A/S, Kolding (DK)

( * ) Notice: Subject to any disclaimer, the term of this patent is extended or adjusted under 35 U.S.C. 154(b) by 237 days.

(21) Appl. No.: 13/262,733

(22) PCT Filed: Mar. 30, 2010
(Under 37 CFR 1.47)

(86) PCT No.: PCT/DK2010/050073
§ 371 (c)(1),
(2), (4) Date: Jul. 12, 2012

(87) PCT Pub. No.: WO2010/112032
PCT Pub. Date: Oct. 7, 2010

(65) Prior Publication Data
US 2012/0325581 A1 Dec. 27, 2012

(30) Foreign Application Priority Data

Apr. 2, 2009 (DK) ............................ 2009 00454
Nov. 10, 2009 (DK) ............................ 2009 70195

(51) Int. Cl.
*F03D 1/00* (2006.01)
(52) U.S. Cl.
CPC .............. *F03D 1/003* (2013.01); *Y02E 10/72* (2013.01)
(58) Field of Classification Search
CPC E04G 3/30; E04G 3/305; E04G 3/325; F03D 1/003; Y02E 10/72
(Continued)

(56) References Cited

U.S. PATENT DOCUMENTS 2,582,385 A * 1/1952 Knudsen ................ 182/113
3,637,047 A * 1/1972 Cox ..................... 182/222
(Continued)

FOREIGN PATENT DOCUMENTS

DE 103 18 675 A1 11/2004
DE 10318675 B4 * 11/2007 .............. B66F 11/04
(Continued)

*Primary Examiner* — Jerry Redman
(74) *Attorney, Agent, or Firm* — Nath, Goldberg & Meyer; Jerald L. Meyer; Tanya E. Harkins

(57) ABSTRACT

The invention concerns a work platform for use in connection with work on a wing blade for a wind energy plant, where the work platform is typically used for working on a wing blade which is brought to a substantially vertical position, and where the work platform is hoisted up and down from a position above the workplace, typically from a region close to the root end of the wing or from the rotor hub. The work platform is provided with space for a person and is preferably adapted for positioning along a leading or trailing edge of a wing blade, and is further including at least two projecting arms for contact against the surface of the wing, where the projecting arms are provided with protective means between the arm and the wing surface. By such a work platform, the most comfortable working conditions can be achieved, as the work platform itself is particularly adapted for use in connection with wings for wind energy plants, and particularly because the projecting arms bear on the surfaces of the wing, whereby the movements of the work platform are secured in relation to the movements of the wing.

15 Claims, 3 Drawing Sheets

(58) Field of Classification Search
USPC .................. 182/141–144, 148, 150, 187
See application file for complete search history.

(56) References Cited

U.S. PATENT DOCUMENTS

| | | | | |
|---|---|---|---|---|
| 4,690,246 | A * | 9/1987 | Hornagold et al. | 182/2.3 |
| 5,351,783 | A * | 10/1994 | Celli | 182/133 |
| 6,012,677 | A * | 1/2000 | Mazzoni | 244/118.1 |
| D632,221 | S * | 2/2011 | Bogaert | D12/52 |
| 7,934,585 | B2 * | 5/2011 | Iversen | 182/142 |
| 8,083,029 | B2 * | 12/2011 | Teichert | 182/128 |
| 8,317,160 | B2 * | 11/2012 | Romo et al. | 254/333 |
| 8,453,797 | B2 * | 6/2013 | Iversen | 182/142 |
| 8,490,749 | B2 * | 7/2013 | Teichert | 182/187 |
| 8,579,085 | B2 * | 11/2013 | Bogaert | 182/133 |
| 8,641,374 | B2 * | 2/2014 | Byreddy et al. | 415/232 |
| 2007/0007074 | A1 * | 1/2007 | Lemburg et al. | 182/128 |
| 2008/0087497 | A1 * | 4/2008 | Boswell et al. | 182/142 |
| 2009/0020361 | A1 | 1/2009 | Teichert | |
| 2009/0173573 | A1 * | 7/2009 | Teichert | 182/19 |
| 2010/0130108 | A1 * | 5/2010 | Mann | 451/75 |
| 2011/0205348 | A1 * | 8/2011 | Fritz et al. | 348/61 |
| 2012/0168252 | A1 * | 7/2012 | Bogaert | 182/142 |
| 2012/0305331 | A1 * | 12/2012 | Rowell | 182/18 |

FOREIGN PATENT DOCUMENTS

| | | | | |
|---|---|---|---|---|
| EP | 1 517 033 | A1 | 3/2005 | |
| EP | 1516846 | A2 * | 3/2005 | ............ B66B 9/187 |
| WO | 2004/092577 | A1 | 10/2004 | |
| WO | 2005054672 | A1 | 6/2005 | |
| WO | 2007085265 | A1 | 8/2007 | |

\* cited by examiner

WORK PLATFORM

FIELD OF THE INVENTION

The present invention concerns a work platform for use in connection with work on a wing blade for a wind energy plant, where the wing blade typically is one of three wings that together constitute a rotor, as the wings at their root ends are mounted on a hub which is mechanically connected to components in the nacelle of the wind energy plant, where the work platform is typically used for working on a wing blade which is brought to a substantially vertical position, and where the work platform is hoisted up and down from a position above the workplace, typically from a region close to the root end of the wing or from the rotor hub.

BACKGROUND OF THE INVENTION

As mentioned in the introduction, the invention concerns a work platform which can be elevated and lowered according to need relative to the item to be worked on, and from where work can be done on the item. Such work platforms are i.a. known from window cleaning and other operations on fronts on high buildings, where the work platform is either adapted to stand and walk on, or to sit in. These work platforms are anchored to the building at a position above the point where the work is to be performed, and are hoisted down and up therefrom, respectively, typically resting against the front of the building by a suitable number of rollers or wheels. The positioning of the work platform may either be controlled from the platform itself, which is typical, or from the anchoring point by an assistant. The prior art types of work platforms are anchored in such a way that they due to their self-weight automatically rest against the front of the building on which they are used. Such work platforms are thus not well suited for application on structures that do not have a flat front on which the platform may rest.

By works on other constructions without a plane front or work face, there is, however, frequently used a work platform which is mounted on an extending lift arm or similar. Such a work platform, however, often has limited range and is moreover very expensive in use compared with a platform which may be hoisted up and down from the structure itself.

In connection with possible work to be done in connection with wings on a wind power plant, there are several drawbacks connected with the prior art types of work platforms. The platform types known from work on building fronts are not suited due to their design, and the platform types mounted on an extendable arm are often not usable due to wind conditions, as the work platform and the wing move in relation to each other. Therefore, it is almost impossible to perform work on a wing from such a work platform. Another drawback of a platform on an extendable arm is insufficient range. In order to counter the mentioned drawbacks, a very simple method is frequently applied when working on a wing, namely rappelling, which provides a great degree of freedom, but also implies other disadvantages. For example, it is not possible carry many tools, equipment or materials for performing the actual tasks. Moreover, there is the great disadvantage that work is only allowed very few hours at a time in this way. Therefore, more workers are required, or the task will last a longer period of time. Certain processes, e.g. grinding, are not allowed with rappelling for safety reasons.

OBJECT OF THE INVENTION

It is the object of the invention to indicate a work platform allowing use under common weather conditions, from where a person may safely and comfortably perform inspection and/or other work on a wing blade on a wind power plant without needing to dismount the wing.

DESCRIPTION OF THE INVENTION

As mentioned in the introduction, the invention concerns a work platform for use in connection with work on a wing for a wind energy plant, where the work platform is provided with space for a person and preferably adapted for positioning along a leading or trailing edge of a wing blade, and further including at least two projecting arms for contact against the surface of a wing, where the projecting arms are provided with protective means between the arm and the wing surface. By such a work platform, the most comfortable working conditions can be achieved, as the work platform itself is particularly adapted for use in connection with wings for wind energy plants, and particularly because the projecting arms bear on the surfaces of the wing, whereby the movements of the work platform are secured in relation to the movements of the wing. In that the projecting arms are provided with protective means between the arm itself and the surface of the wing, it is achieved that the support arms may readily be pressed against the wing surface, thereby securing the movements of the work platform. This may be particularly relevant in connection with performing certain operations on a wing.

A work platform according to the invention may be provided with one or more sets of projecting arms, where each set of arms may be designed differently depending on the use to which they are intended and on the position at which they are arranged on the work platform. For example, there may be arranged one or more sets of projecting arms, immediately under or opposite the area at which a person stays while performing the required work. At least one set of such projecting arms may, however, also advantageously be disposed at the upper part of the work platform which typically includes a bracket-like structure above the working person, and which extends towards the wing. Hereby is achieved the advantage that the work platform is supported against the wing at an area above the person, enabling work at the end of a wing while at the same time keeping the work platform securely fixed and/or supported on the wing structure at a point above the work area.

A work platform according to the invention may advantageously be provided with projecting arms at the work place as well as above the person, as there is nothing to hinder the existence of several sets of projecting arms. These may be connected and interacting, but may advantageously also be individually operated and adapted for use together or individually.

In a preferred variant of a work platform according to the invention, the work platform is provided with a seat. Hereby is achieved greater safety for the person performing the task, and at the same time enhanced comfort for the person is achieved. Moreover, the person may perform the task at a relatively small distance from the wing itself as in principle he may sit on the seat with a leg at each side of the wing, and thus achieve optimal conditions for inspection tasks or the like.

A work platform for use in connection with work on a wing blade for a wind energy plat according to the invention may advantageously be designed such that at least one of the arms of the work platform consists of a first partial arm and one or more further partial arms, where the first partial arm may be provided with an articulated joint between the innermost partial arm and the work platform, and further provided with at least one articulated joint between the first partial arm and the second partial arm. Hereby is achieved the evident advantage that the projecting arms may more easily be adapted to the contour of the wing surface at precisely the position where the work platform is situated. The work platform may thus be secured at a stable position relative to the wing, and therefore it is possible to perform work on the wing under wind conditions where it would be impossible otherwise.

In order to protect the surfaces of the wing, and to ensure as good holding ability as possible by the projecting arms, at least the first and/or the second partial arm may be provided with one or more contact rollers. These contact rollers may advantageously be broad air-filled rollers which are provided on a shaft and which may be pressed against the wing surface. Obviously, other types of contact rollers may be used, e.g. there may be used a number of juxtaposed rubber wheels, thereby providing the required effect. Such contact rollers may advantageously be made of polyurethane or other material which is wear resistant and which does not leave marks on the wing surface.

In order to achieve a precise and suitable effect and utilisation of the projecting arms, at least one of the articulated joints on the projecting arms may be controlled by means on the work platform. It is thus the operator who controls the positions of the projecting arms in relation to the wing. Hereby it becomes possible to dispose the projecting arms at a suitable loose position during elevating and lowering of the work platform and to adjust the projecting arms for contact against the wing surface when the work and/or the wind conditions so require.

In order to ensure that the work platform comes as close to the wing as desired without damaging the edges of the wing, contact rollers may advantageously be fitted between the two projecting arms and on the structure of the work platform above the head of the person. Hereby it is ensured that the work platform may rest against the wing surface without causing damage to the wing.

A work platform for use in connection with work on a wing blade for a wind energy plant according to the invention may include means for surface treatment of the wing. By surface treatment is meant processes that work, remove or add something to the surface of the wing blade, e.g. grinding, cleaning, application of paint or other fluids etc.

The means for surface treatment may be disposed on the work platform itself, or on the projecting arms on the upper and/or lower part of the platform. Alternatively, the means may be disposed on an extra set of projecting arms which are controllable from the work platform. The means may hereby be brought in contact with or vicinity of the wing without adjusting the arms on which contact rollers are mounted.

The means may include, but are not limited to spray nozzles for dosing liquid, static or movable brushes and static or movable grinding devices, and combinations thereof. Nozzles for dosing liquid will typically be connected with a liquid container provided on the work platform. Alternatively, the nozzles may be connected with a liquid supply on the ground or close to the nacelle of the wind turbine via a hose.

In an alternative embodiment of the work platform according to the invention, the contact rollers and the surface treatment means may be integrated with each other. For example, the contact rollers may be equipped with brushes or sandpaper. The surface treatment will thereby occur concurrently with the work platform being elevated or lowered along the wing blade.

The means for surface treatment may either be controlled from the work platform itself, or they may be remotely controlled. In some situations it may be inexpedient that the work platform is manned during the surface treatment. The ability of remotely operating the means for surface treatment, e.g. from the ground or the nacelle of the wind turbine, provides for the work platform to be able to perform a surface treatment unmanned.

In a preferred variant of a work platform according to the invention, the said control means may be connected with two arms, namely with a projecting arm at each their side of a wing blade for a wind energy plant. In yet a variant, the said control means may act synchronously on two or more projecting arms. Hereby it is possible to adjust the position of the arms with a central crank handle or a central grip. For example, there may be use a manual screw spindle or other types of spindles that may be electrically, hydraulically or pneumatically powered.

A particularly preferred variant of a work platform for use in connection with work on a wing blade for a wind energy plant is adapted for mounting of up to a plurality of toolboxes, where the toolboxes are replaceable and packed particularly for a specific task. It is thus possible to equip a work platform with exactly the tools and the materials to be used for a specific task. At the same time, it is easy to pack a service car, as one only needs to carry the various ready-packed toolboxes and boxes of materials. When the operator e.g. is finished with his work on one wing blade, and the platform is hoisted down in connection with turning the rotor for positioning the next wing blade, a box of material may easily be replaced with a new one, and the work may quickly be resumed.

During use of a work platform according to the invention, it is often necessary with a control wire which is connected with the work platform, and by which the movements of the work platform may be controlled from the ground while the platform is positioned between the ground and the lowermost part of the wing, at which position the work platform obviously cannot be supported by the surfaces of the wing. A work platform according to the invention may in one variant be provided with an anchor, preferably an earth anchor, to which the control wire is connected, where the work platform is provided with means for tightening and slacking the control wire from the work platform. By using an anchor it is not necessary to be able to communicate with a person on the ground in order to direct his pull in the control wire. By a solution as described, the operator in the work platform may perform the required slacking or tightening of one or more control wires by himself until there is contact with the wing, and the projecting support arms secure the work platform in the correct position. The one or more control wires may be controlled and regulated by a control handle on the work platform such that the operator may readily and simply control the work platform into position by regulating which wires that are to be slackened and/or tightened. This control and regulation may advantageously include a computer or similar equipment.

A further embodiment of a work platform according to the invention is where the work platform includes a safety wire, where the safety wire is passed around the wing blade and fixed to the work platform at least one end, where the length of the safety wire is adapted to the actual position of the work platform in the longitudinal direction of the wing blade. This safety wire has the purpose of ensuring that the work platform cannot be pressed free of the wing edge, thereby causing a dangerous situation for the operator.

The object of the invention is also achieved by a method for working on a wing blade, such as repair or treatment of a wing of a wind energy plant, where the wind energy plant includes a rotor upon which the wing blade is mounted, in that the method includes the following steps: a) the wing blade is positioned in a substantially vertical position; b) a work platform with a worker is hoisted to a work place; and c) at least two individually projecting arms from the work platform are brought to support on the surface of the wing blade, as the platform is equipped with protective means disposed between the individual arms and the wing surface.

According to an advantageous embodiment, the wing blade is disposed in the mainly vertical position with its wing tip pointing towards the ground, and the worker is hoisted to a working place from a position above the working place, typically from an area close to the root end of the wing or from the rotor hub. The work platform is preferably equipped with a place for the worker. Also, it is evident that any of the preceding disclosed embodiments of the work platform may be combined with the method according to the invention.

DESCRIPTION OF THE DRAWING

The invention is described in the following with reference to the drawing, wherein.

DETAILED DESCRIPTION OF EMBODIMENTS OF THE INVENTION

Figure 1:
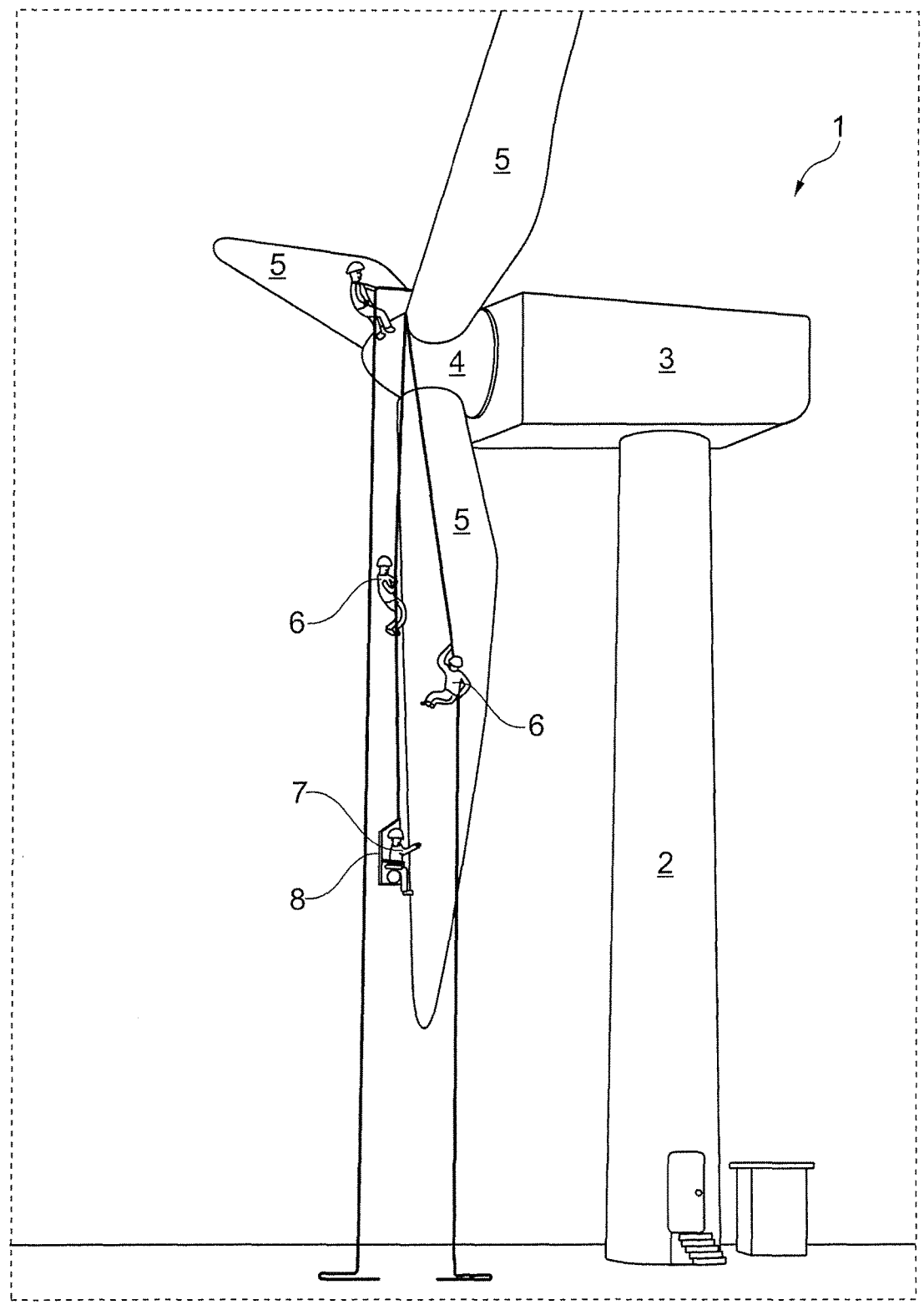
FIG. 1 shows a wind energy plant on which work is performed.

In FIG. 1 appears a wind energy plant 1 of a known type with a tower 2 upon which a nacelle 3 is mounted. From the nacelle 3 extends a not visible main shaft on which a hub 4 with three wing blades 5 is mounted. In the shown situation, the wind energy plant is stopped, and a wing 5 is braked and retained in a position approximately along the tower 2. Furthermore, staff 6 are seen rappelling along the wing 5 while a person 7 is working from a work platform 8 according to the invention.

Figure 2:
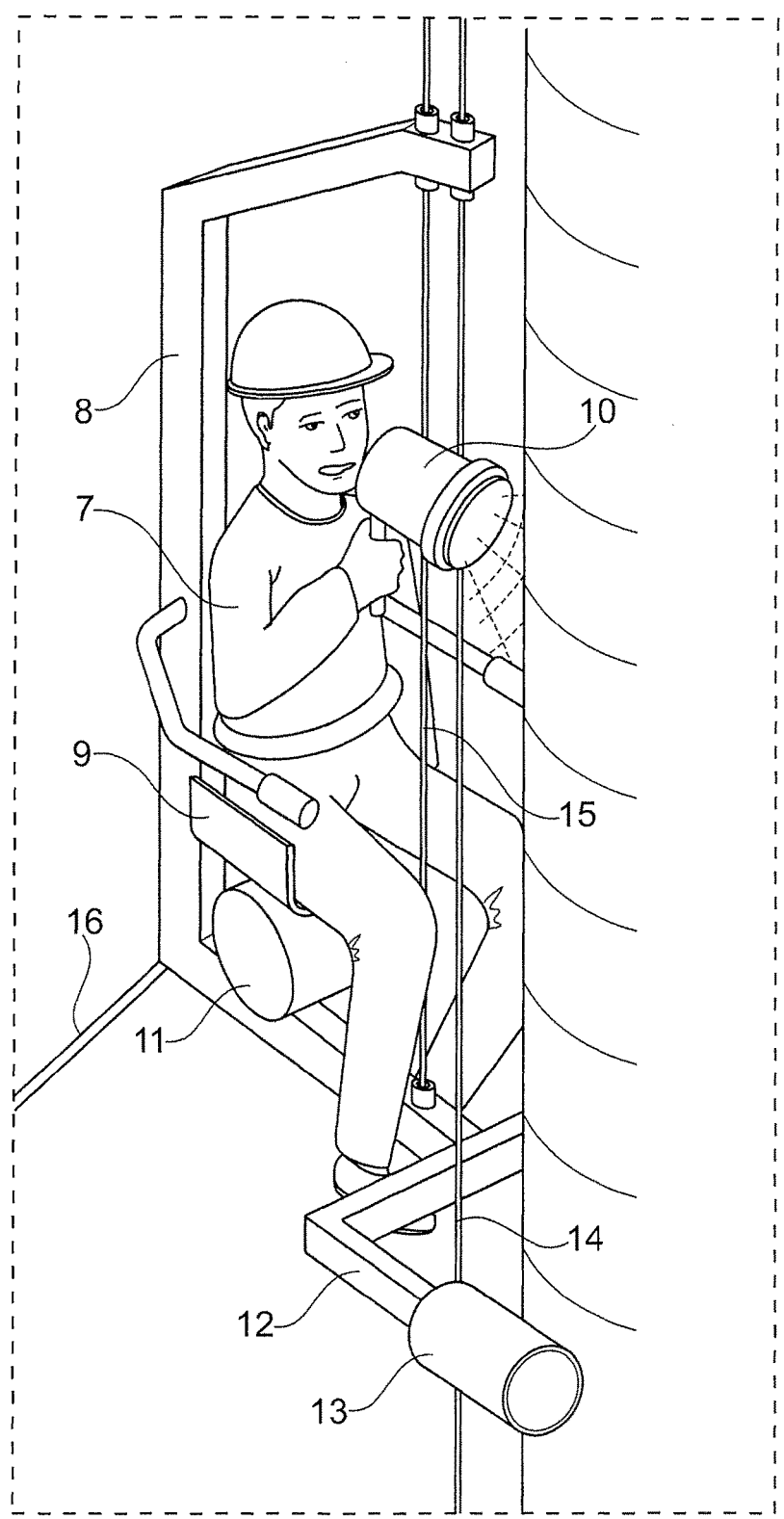
FIG. 2 shows a work platform.

In FIG. 2 appears a close-up view of the work platform 8 during use, from which it clearly appears that a person 7 is seated in a seat 9 and performs a work with a suitable tool 10. Under the seat 9 is provided a motor 11 which is used for elevating and lowering the work platform itself relative to the wing 5. In front of the person 7 and in front of his feet, two projecting arms 12 are arranged, of which only one is seen as the other is on the other side of the wing. At the end of the visible arm 12 appears a contact roller 13 which may roll and/or press against the wing 5 without leaving damage or marks. The projecting arms 12 may be provided with not shown means for adjusting their mutual positions such that they may be adapted to the actual cross-section of the wing 5 at the point where the work platform 8 is located. This adaptation of the positions of the projecting arms may advantageously be effected from an operating handle or similar from the work platform 8.

Furthermore, in FIG. 2 is seen a safety wire 14 which in case of breakage of the primary line, namely the hoisting line 15, will serve as safeguard against the work platform 8 falling against the ground. Moreover, a control wire 16 is seen which may be used during positioning the work platform 8 relative to the wing 5 when the work platform is elevated from the ground and up to the outer point of the wing. This is particularly necessary if the wing to be worked on is provided with a curvature at the outermost part. In addition, there may be more control wires, e.g. connected with the sides of the work platform. These control wires may, as mentioned earlier, be connected with anchorings at the foot of the wind energy plant.

Figure 3:
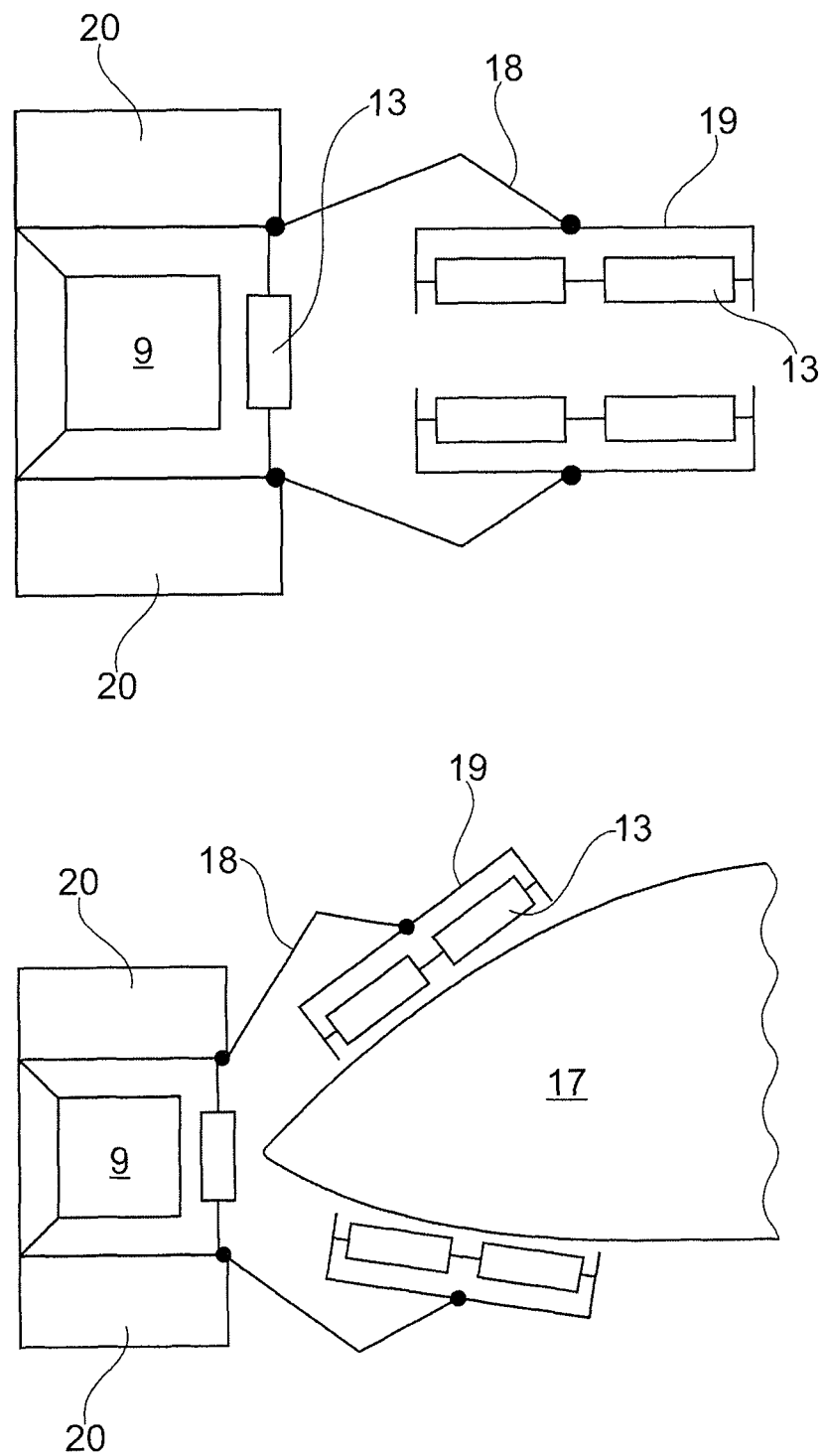
FIG. 3 shows a work platform as seen from above relative to a wing.

In FIG. 3 appears a work platform 8 as seen from above in a somewhat schematic view, where the two projecting arms 12 are seen in neutral position in front of the work platform 8 itself, as well as the projecting arms 12 are seen in a position where they rest against the surface of a wing cross-section 17. Moreover, the projecting arms 12 are seen in an embodiment with a fixed inner partial arm 18 and a movable outer partial arm 19. In the shown embodiment, contact rollers 13 are mounted on the outermost movable partial arms 19. By such a design there are provided good conditions for securing the work platform 8 to a wing 5 under wind conditions where it would otherwise be impossible to work by means of rappelling or from a work platform on a lift arm or the like. In order to ensure that the work platform 8 comes as close to the wing 5 as possible, contact rollers 13 may advantageously be fitted between the two projecting arms 12 and at a not shown position on the structure of the work platform above the head of the person 7. In FIG. 3 is also seen toolboxes 20 mounted at both sides of the seat 9. These toolboxes may, as mentioned above, be packed for specific tasks and be mounted depending on the task to be performed.

The invention is not limited to the above mentioned variants shown in the Figures, but may be adapted and modified in any thinkable way within the scope of the subsequent patent claims.

The invention claimed is:

1. A work platform for work on a wing blade for a wind energy plant, comprising:
   the wind energy plant comprising at least three wing blades constituting a rotor, the wing blades each having a leading edge, a trailing edge, and a root area, and the wing blades mounted to a hub at the root area, the wing blade being brought to a substantially vertical position;
   the work platform extending vertically in relation to the substantially vertical wing and positioned along a wing surface of the leading edge or the trailing edge of the wing blade, the work platform being hoisted up and down the wing blade by a hoisting line from a position above a workplace from a region close to the root area or the hub and further comprising:
   an upper part and a lower part,
   a space for a work person between the upper part and the lower part, having wherein the space for a work person comprises a front side and a back side, the front side facing the wing blade,
   at least two individual projecting arms extending from the lower part of the work platform on the front side toward the wing surface, the individual projecting arms securing movement of the work platform by wrapping around the leading edge or the trailing edge and bearing on the wing surface,
   at least one of the individual projecting arms further comprising:
      a first partial arm,
      one or more further partial arms, wherein at least the first partial arm is an innermost partial arm and at least one or more of the further one partial arms is an outermost partial arm, an articulated joint is provided between the innermost partial arm and the work platform, and at least one further articulated joint is provided between the innermost partial arm and the outermost partial arm, and wherein a protective means comprising contact rollers are connected to the individual projecting arms during use and the protective means are arranged between the outermost partial arm of the individual projecting arms and the wing surface.

2. The work platform for work on a wing blade for a wind energy plant according to claim 1, wherein the work platform includes at least two projecting arms for contact with the wing surface, where the projecting arms are arranged close to the upper part of the work platform.

3. The work platform for work on a wing blade for a wind energy plant according to claim 1, wherein the work platform is provided with a seat.

4. The work platform for work on a wing blade for a wind energy plant according to claim 1, wherein the first and/or the second partial arm is provided with one or more contact rollers.

5. The work platform for work on a wing blade for a wind energy plant according to claim 1, wherein at least one of the articulated joints on the projecting arms is controlled by means on the work platform.

6. The work platform for work on a wing blade for a wind energy plant according to claim 1, wherein the work platform includes means for surface treatment of the wing blade.

7. The work platform for work on a wing blade for a wind energy plant according claim 1, wherein the work platform includes means for surface treatment of the wing blade, where said means for surface treatment is arranged on at least one of the projecting arms of the work platform.

8. The work platform for work on a wing blade for a wind energy plant according to claim 1, wherein the work platform includes means for surface treatment of the wing blade, where said means for surface treatment of the wing blade is integrated in the protective means, where said protective means comprises contact rollers.

9. The work platform for work on a wing blade for a wind energy plant according to claim 1, wherein the work platform includes means for surface treatment of the wing blade, where said means for surface treatment of the wing blade are controllable either from the work platform or via remote control.

10. The work platform for work on a wing blade for a wind energy plant according to claim 1, wherein at least one of the articulated joints on the projecting arms is controlled by means on the work platform where said control means are at least connected with two arms, namely with a projecting arm at each side of a wing blade for a wind energy plant.

11. The work platform for work on a wing blade for a wind energy plant according to claim 1, wherein at least one of the articulated joints on the projecting arms is controlled by means on the work platform, where said control means act synchronously on two or more projecting arms.

12. The work platform for work on a wing blade for a wind energy plant according to claim 1, wherein the work platform is adapted for mounting of up to a plurality of toolboxes, where the toolboxes are replaceable and packed particularly for a specific task.

13. The work platform for work on a wing blade for a wind energy plant according to claim 1, wherein the work platform further includes an anchor, preferably an earth anchor, to which a control wire is connected, where the work platform is provided with means for tightening and slacking the control wire from the work platform.

14. The work platform for work on a wing blade for a wind energy plant according to claim 1, wherein the work platform includes a safety wire, where the safety wire is passed around the wing blade and fixed to the work platform at least at one end, where a length of the safety wire is adapted to an actual position of the work platform in a longitudinal direction of the wing blade.

15. A method of using the work platform of claim 1 for repair or treatment of a wing blade for a wind energy plant, the method comprising the following steps:

a) the wing blade is positioned in a substantially vertical position;

b) the work platform with a worker is hoisted to a work place; and c) at least two individually projecting arms from the work platform are brought to support on the wing surface, as the work platform is equipped with protective means disposed between the individual projecting arms and the wing surface.

* * * * *

UNITED STATES PATENT AND TRADEMARK OFFICE
CERTIFICATE OF CORRECTION

PATENT NO. : 9,624,901 B2  Page 1 of 1
APPLICATION NO. : 13/262733
DATED : April 18, 2017
INVENTOR(S) : Sabine Gunther et al.

It is certified that error appears in the above-identified patent and that said Letters Patent is hereby corrected as shown below:

In the Claims

Claim 1, Column 6, Line 52, please delete the word "having".

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*